Feb. 21, 1967   L. M. FLAGG   3,305,244
GOLF CART
Filed Nov. 12, 1964   2 Sheets-Sheet 1

INVENTOR.
LUCIEN M. FLAGG
BY
*Baldwin & Martin*
ATTORNEYS

Feb. 21, 1967    L. M. FLAGG    3,305,244
GOLF CART

Filed Nov. 12, 1964    2 Sheets-Sheet 2

INVENTOR.
LUCIEN M. FLAGG
BY
Baldwin & Martin
ATTORNEYS

United States Patent Office 3,305,244
Patented Feb. 21, 1967

3,305,244
GOLF CART
Lucien M. Flagg, P.O. Box 1211,
St. Simons Island, Ga. 31522
Filed Nov. 12, 1964, Ser. No. 410,545
2 Claims. (Cl. 280—47.35)

This invention relates to golf carts and has as its object the provision of a novel and improved manually drawn golf cart the movement of which may more easily be guided, which may be moved over rough terrain and up and down hill more easily and with more comfort to the user, and which may readily and quickly be dismantled for ease of transportation and storage.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

Figure 1:
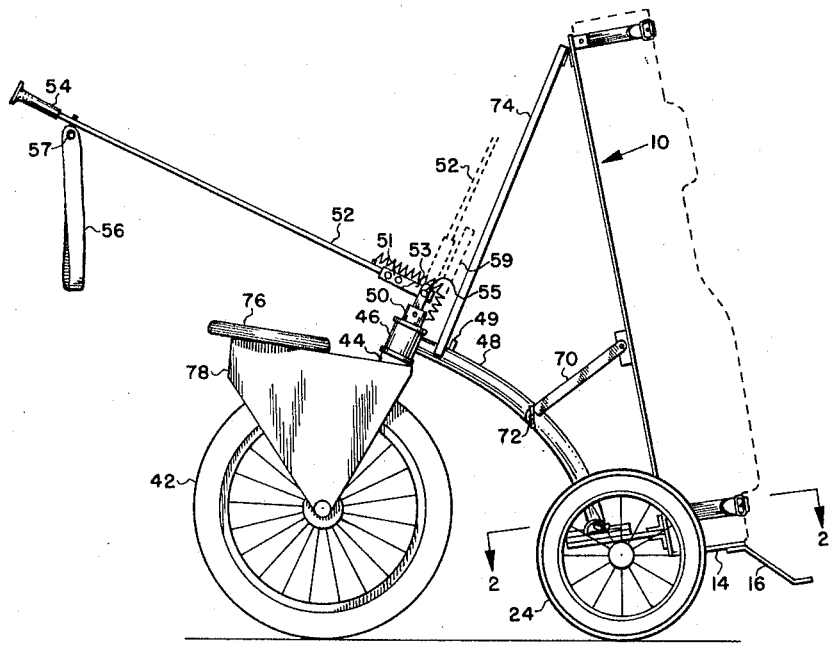
FIG. 1 is a side view of a golf cart constructed in accordance with the present invention.

With reference to the drawings and particularly FIG. 1 thereof a golf cart incorporating the present invention comprises support means generally indicated at 10 and adapted to support a plurality of golf clubs. The support means may be of a type as shown in FIG. 1 which is adapted to support a golf bag, indicated in broken lines in FIG. 1, or may be of a type referred to as a bagless support wherein the support has a plurality of elements for gripping or otherwise retaining a plurality of golf clubs thereon. In the specific embodiment shown in FIG. 1, the support means comprises a generally vertically extending member 12 from the lower end of which extends a base 14 on which a golf bag may be supported. A plurality of straps or the like may be provided to detachably secure the golf bag to the support means with the straps being connected to the vertical member 12 and adapted to extend around the golf bag. A ground engageable rest or standard 16 depends from the base 14 of the support means adjacent the rearward end of the base 14.

Figure 3:
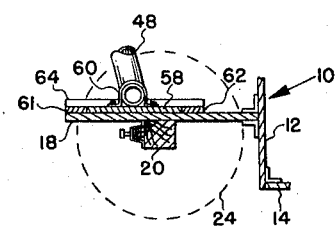
FIG. 3 is a cross-sectional view substantially along the line 3—3 of FIG. 2.
Figure 5:
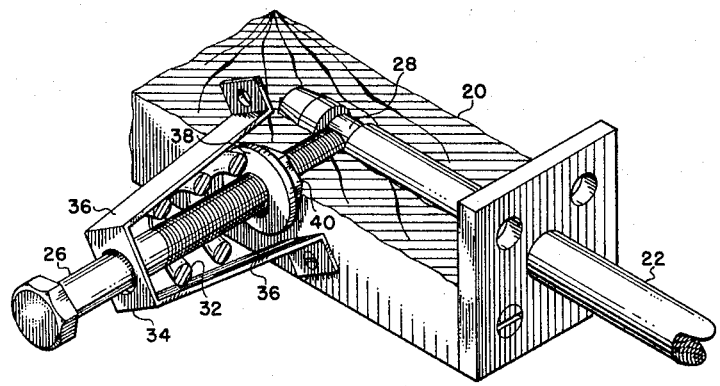
FIG. 5 is an enlarged isometric view, partly in section, of a portion of the cart of FIG. 1.

Extending forwardly from the vertical member 12 at right angles thereto is a plate 18. With reference to FIGS. 3 and 5, extending across the underside of the plate 18 and fixed relative thereto is a journal block 20. The opposite ends of the block 20 are provided with openings for receiving and supporting the axles 22 of a pair of rear wheels 24. With reference to FIG. 5, each of the axles 22 is releasably retained in the block 20 by a spring loaded latch, whereby the axles 22, and thus the wheels 24, may be selectively disassembled from the support means 10. The latch comprises a reciprocable member or plunger 26 in the form of a bolt. One end of the bolt 26 extends into a side opening in the block 20, the axis of the side opening extending at right angles to the axis of the opening receiving the axle 22. The inner end of the bolt is engageable within an annular peripheral groove 28 on the axles 22 which is registrable with the opening receiving the bolt 26. The bolt 26 is urged inwardly of the block 20 by means of a compression coil spring 32 telescopically disposed over the bolt. The spring 32 is engageable at its other end with a cross piece 34 which is integral with and extends between one end of a pair of legs 36 of a bracket with the other end of the legs 36 being mounted on the block 20. The cross piece 34 of the bracket has an opening through which the bolt 26 extends. The inner end of the spring 32 is engaged with a washer 38 arranged over the bolt. A nut threaded on bolt 26 and engaged with the side of the washer 38 opposite the spring 32 provides a support for the washer 38. Adjustment of the nut 40 will effect adjustment of the preloading of the plunger 26. It will further be apparent that to dismantle the wheels 24 from the support means 10 the outer end of the bolt 26 may be manually gripped and pulled outwardly to disengage the bolt from the groove 28 on the axle 22, thereby permitting the axle to be withdrawn from the block 20.

With further reference to FIG. 1 the golf cart of this invention further comprises a steerable front wheel 42. The wheel 42 is suitably journaled for rotation about its axis by means of a frame member 44 which may be a conventional tricycle fork. The frame member 44 is in turn journaled, as at 46, on one end of a frame 48 the other end of which is detachably connected to the support means 10. Mounted for rotation with the fork or frame member 44 is a shaft 50 one end of which extends upwardly beyond the bearing 46 at the forward end of the frame 48. The outer end of the shaft 50 is connected to an elongated handle 52 which normally extends forwardly of and over the front wheel 42. In accordance with one aspect of the invention, the handle 52 is mounted for movement with the shaft 50 about the steering axis of the wheel 42 and for pivotal movement relative to the shaft 50 and thus the wheel 42 about an axis extending at right angles to the steering axis of the wheel. More particularly in the specific embodiment of FIG. 1, a pair of parallel plates 51 and 53 are fixed to the rearward end of the handle 52 on opposite sides thereof, whereby the plates may be disposed on opposite sides of the shaft 50. A pivot pin 55 extends through the plates 51 and 53 and diametrically of the shaft 50, whereby the rearward end of the handle 52 is pivotally mounted on the shaft for vertical movement about an axis extending diametrically of the shaft 50 and thus at right angles to the steering axis of the wheel 42.

The outer or forward end of the handle 52 is provided with a hand grip 54 having an enlarged outer end to facilitate grasping of the handle for pulling the cart along the ground. Also, attached adjacent the outer end of the handle 54 just rearwardly of the grip 54 is a strap 56 preferably of resilient rubber-like material. The strap is preferably initially an elongated member which is folded back upon itself with both ends connected as at 57 to the handle 52 thereby providing a loop through which the hand may be inserted.

Figure 2:
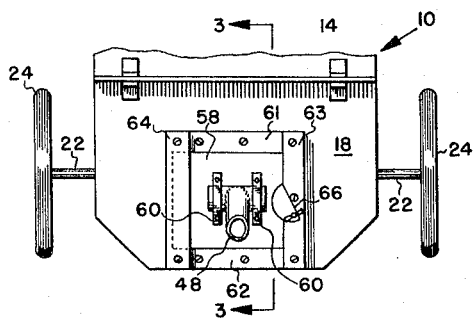
FIG. 2 is an enlarged fragmentary cross-sectional view substantially along the line 2—2 of FIG. 1.

With particular reference to FIGS. 1 and 3, the rearward end of the frame member 48 pivotally mounts a latch member or a pad 58. More particularly the frame 48 terminates at its rearward end in a T. The pad 58 is pivotally mounted on the arms of the T by a pair of straps 60 the ends of each of which are fixed to the pad with the portion of each strap intermediate its ends partially wrapped around the arm of the T. The pad is engageable within a socket on the plate member 18 fixed to the vertical member 12 of the support means 10. With reference to FIGS. 2 and 3, this socket is formed in part by a pair of parallel strips 61 and 62 each having a thickness corresponding to the thickness of the plate 58. The strips are fixed to the plate 18 in spaced relation by a distance corresponding to the width of the pad 58. The socket is further defined by an end member 63 extending across the rightward ends, as viewed in FIG. 2, of the strips 61 and 62. The end member 63 has a thickness corresponding to the thickness of the pad 58 and is fixed on the plate 18. A second-end member (not shown) extends across the other ends of the strip 61, 62 and has a thickness corresponding to the pad 58. The member at the leftward end of the pad, as viewed in FIG. 2, is cut out as indicated in broken lines in FIG. 2 to define the leftward end of the socket receiving the leftward end of the pad, and a retainer strip or member 64 is fixed in overlying relation to the portion of the pad 58 received within the cut out portion in the leftward end member so as to retain the leftward end of the pad 58 and tend to prevent its movement away from the plate 18 and out of the socket. A keeper 66 is pivotally mounted at one end such as by a bolt and wing nut on the end member 63 part forming the socket receiving the pad 58. The keeper 66 is pivotable parallel to the general pane of the socket so as to extend over the pad 58 in engagement therewith when the pad is received in the socket, thus preventing the rightward end of the pad from being moved away from the plate 18.

Figure 4:
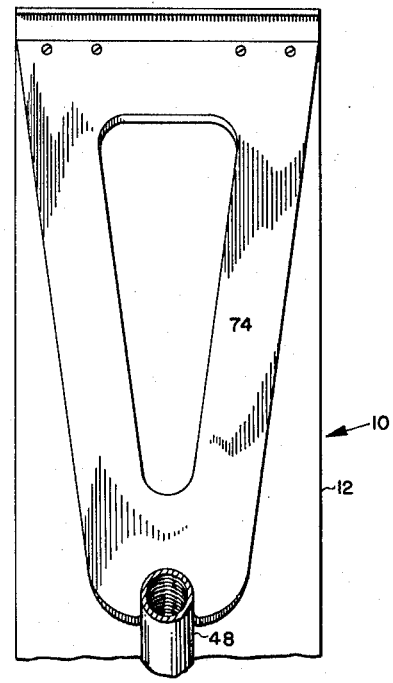
FIG. 4 is an enlarged front view of a portion of the cart of FIG. 1.

With reference to FIGS. 1 and 4, means are provided to brace the generally vertically extending club support means 10 on the frame 48. More particularly an arm 70 is pivotally mounted at one end on the support member 12 for movement about a generally horizontally extending axis. The other end of the arm 70 is provided with a notch which is engageable over a threaded stud on the frame 48 between the frame and a wing nut 72 mounted on the stud. The arm 70 is of a length selected to provide that when the free end of the arm is clamped onto the frame 48 by the wing nut 72 the back-rest 16 on the under side of the support means 10 will be spaced a substantial distance above the ground so as not to interfere with movement of the cart. Where the club support means 10 is of a type as shown in FIG. 1 adapted to support a golf bag filled with clubs it may be desirable to provide additional bracing means for the club support means 10. In the embodiment of FIG. 1 a brace or arm 74 is hingedly connected at one end adjacent the upper end of the vertical support member 12 for swinging movement about a horizontal axis. The lower or free end of the arm 74 is, as is shown in FIGS. 1 and 4, provided with a notch which is in wedging engagement with the tubular frame 48. More particularly it will be seen in FIG. 1 that the frame 48 is inclined downwardly and rearwardly. The length of the arm 74 between its hinge axis and the inner end of the notch in the arm is such that when the arm is swung outwardly from the vertical support member 12 after the support means has been connected to the frame 48 the arm 74 may be brought into wedging engagement with the frame 48 to provide a firm support for the upper end of the club support means. A stop 49 or the frame 48 is engageable with the free end of the arm 74 to prevent the arm from slipping down and off the inclined frame 48.

With reference to FIG. 1, it will also be observed that the cart of this invention is provided with a seat on which the user may rest. More particularly the seat 76 is supported by a frame 78 which in turn is mounted on the fork or support means 44 which mounts the front wheel. The handle is normally resiliently retained in an upright position generally in alignment with the shaft 50 by a spring 59. The spring has its ends fixed relative to the shaft 50 and handle 52, respectively, and braces the handle in a clockwise direction as viewed in FIG. 1. When the handle is in its vertical position it is clear of the seat 76. Also, the resilient retention of the handle in a vertical position when it is not in use makes it easy for the user to reach without bending over.

In the use of the cart of this invention the user may grasp the hand grip portion 54 of the handle 52 and draw the cart along the ground. The tri-wheel construction of the cart assures that the cart is evenly balanced and the user need not support any weight of the cart as is the case in conventional two-wheel carts. Also, with the cart of this invention when the cart is drawn over rough ground, there is no shifting of weight on the handle as occurs with conventional two-wheel carts. Also, the pivoted handle eliminates substantially all the vibration felt by the user when the cart is drawn over rough terrain. When the cart is pulled up a hill the resilient shock absorbing strap 56 may be used to provide additional ease and comfort in drawing the cart. Additionally, when drawing the cart over rough terrain the use of the shock absorbing strap reduces fatigue. The steerable front wheel makes the cart much easier to maneuver. Additionally, the provision of the third front wheel eliminates a necessity for laying the cart down or sitting it up on a back rest each time the cart is halted.

Not only does the cart of this invention provide increased ease of use but also the cart may be readily disassembled for transportation or storage; for example, when it is desired to dismantle the cart for storage in the trunk of an automobile, the arm 70 is disengaged from the frame 48 by backing off the wing nut 72 and lifting the arm 70 to disengage it from the frame 48. The support means 10 can then be tilted rearwardly until the bracket 16 engages the ground whereupon the support means will remain in a generally vertical position. The backward tilting of the support means will automatically disengage the arm 74 from the frame 48. The frame 48 may then be detached from the club support means by pivoting the latch keeper 66 to clear the pad 58 whereupon the pad may be lifted out of the socket on the plate 18. If desired the golf club support means, with a club bag or clubs mounted thereon, may be stored with the rear wheels 24 attached merely by standing the support means in a locker or the like with the suport means supported in vertical position by the back rest 16 and wheels 24. Where it is desired to further dismantle the cart the rear wheels may be readily detached from the club support means. More particularly the bolts 26 may manually be pulled outwardly to release the axles 22 for movement out of the block 20. In storing the front wheel and frame assembly the handle 52 may be swung rearwardly so as to lie over the frame 48 thus decreasing the storage space required.

In assembling the cart for use, the rear wheels 24 are assembled merely by inserting the axles 22 into the block 20 and pressing them inwardly until the bolt 26 is engaged in the groove 28 of the axle. The inner end of each axle is preferably tapered so as to effect a camming of the bolt 26 outwardly as the axle is inserted. In this connection the nut 40 may be adjusted relative to the bolt 26 so that when the nut is bottomed on the block 20 prior to insertion of the axle into the block 20, the inner end of the bolt will extend only partially into the opening for receiving the axle 22 and particularly will not extend inwardly beyond a point wherein the end of the bolt will be engaged by the tapered end surface of the axle as the axle is inserted. In assembling the frame 48 to the golf support means the pad 58 is moved into the socket on the plate 18 by inserting one end of the pad beneath the retainer 64 and then sliding the pad into the socket. The keeper 66 is then rotated over the pad and the wing nut 67 tightened by hand to lock the keeper in place. The brace 70 is then clamped to the frame by manually tightening the wing nut 72, and the arm 74 is wedged into engagement with the frame 48.

While only certain preferred embodiments of this invention have been shown and described by way of illustration, many modifications will occur to those skilled in the art and it is, therefore, desired that it be understood that it is intended in the appended claims to cover all such modifications as fall within the true spirt and scope of this invention.

What is claimed as new and what is desired to secure by Letters Patent of the United States is:

1. A manually drawn tri-wheel golf club cart comprising generally vertically extending club support means, a pair of rear wheels carried by said support means, a steerable front wheel, a frame, means mounting the front wheel on one end of the frame for movement about a steering axis, and means releasably connecting the other end of said frame to said support means comprising a pad pivotally mounted on one of the frame and support means, a retainee on the other of said frame and support means, including a socket receiving said pad, means providing a lip overlying one edge portion of the pad and tending to retain the pad in said socket, a keeper overlying another edge portion of the pad opposite said one edge portion, and means mounting said keeper for movement into and out of overlying relation with the pad.

2. A manually drawn tri-wheel golf club cart comprising generally vertically extending golf club support means, a pair of rear wheels, hand operable means releasably mounting said rear wheels on said support means, a steerable front wheel, means connecting said front wheel to said support means including a frame, hand operable latch means connecting one end of said frame to said support means, means mounting said front wheel on said frame for rotation about the axis of said front wheel and for movement relative to said frame about a steering axis, the last mentioned means including a shaft fixed for movement with said front wheel about said steering axis, a handle pivotally connected to said shaft for movement therewith about said steering axis and relative thereto about an axis extending at right angles to said steering axis, a hand engageable resilient draw strap connected at one end to said handle, brace means disposed above said rear wheels and pivotally connected at one end of one of said support means and frame, means providing a hand operable releasable connection between the other end of said brace means and the other of said support means and frame, and a ground engageable rest carried by said support means and disposed rearwardly of said rear wheels, said rest being above the level of the ground when the other end of said brace means is connected to said other of said support means and frame.

References Cited by the Examiner
UNITED STATES PATENTS

| | | | |
|---|---|---|---|
| D. 189,814 | 2/1961 | Smith | 280—47.35 X |
| 1,166,463 | 4/1916 | King | 280—62 |
| 1,299,313 | 4/1919 | Elrod | 280—62 |
| 1,481,002 | 1/1924 | Ferris | 280—62 |
| 2,417,727 | 3/1947 | Battle. | |
| 2,425,688 | 8/1947 | Schulte. | |
| 2,583,196 | 1/1952 | Fander et al. | 280—47.35 |
| 2,610,072 | 9/1952 | Head. | |
| 2,777,707 | 1/1957 | Gloes. | |
| 3,064,990 | 11/1962 | Salvucci. | |
| 3,123,173 | 3/1964 | Jacobs. | |

FOREIGN PATENTS

| | | |
|---|---|---|
| 483,754 | 4/1938 | Great Britain. |
| 988,280 | 6/1951 | France. |

MILTON BUCHLER, *Primary Examiner.*

BENJAMIN HERSH, *Examiner.*

C. C. PARSONS, *Assistant Examiner.*